Feb. 11, 1941.   C. BOSICK   2,231,054
VEHICLE LIFT
Filed Feb. 20, 1940   2 Sheets-Sheet 1

Inventor:
Charles Bosick
By
Attorney

Feb. 11, 1941.  C. BOSICK  2,231,054

VEHICLE LIFT

Filed Feb. 20, 1940  2 Sheets-Sheet 2

Inventor:
Charles Bosick
By Homer C. Sweet
Attorney

Patented Feb. 11, 1941

2,231,054

UNITED STATES PATENT OFFICE 2,231,054

VEHICLE LIFT

Charles Bosick, Jefferson County, Colo.

Application February 20, 1940, Serial No. 319,815

4 Claims. (Cl. 254—92)

This invention relates to power-actuated lifts or elevators, and more particularly to such devices as specifically arranged to lift or elevate an automotive vehicle above the ground to facilitate maintenance work thereon, and has as an object to provide an improved lift of the character described.

A further object of the invention is to provide an improved construction and arrangement of elements constituting a vehicle lift arranged for electric power actuation.

A further object of the invention is to provide an improved vehicle lift in the form of a complete, self-contained unit requiring only connection with an electric circuit for its operation.

A further object of the invention is to provide an improved vehicle lift arranged to positively support a load when stopped at any point within its range of actuation.

A further object of the invention is to provide an improved vehicle lift susceptible of convenient access to and repair and replacement of its actuating elements.

A further object of the invention is to provide an improved vehicle lift arranged to be automatically stopped at each limit of its range of actuation.

A further object of the invention is to provide an improved construction and arrangement of elements in a vehicle lift, whereby the relatively-movable elements of the assembly are protected from contact with water, snow, and other objectionable foreign matter.

A further object of the invention is to provide improved means for automatically and efficiently lubricating the working elements of a vehicle lift.

A further object of the invention is to provide an improved vehicle lift that is relatively simple and inexpensive of manufacture and installation; that is positive and efficient in operation; that requires no accessory equipment or facilities for its operation; that is adapted for installation and operation in unprotected locations; and that requires little attention or maintenance throughout a long period of practical use.

My invention consists in the construction, arrangement, and combination of elements hereinafter set forth, pointed out in my claims, and illustrated by the accompanying drawings, in which—

Figures 1, 4:
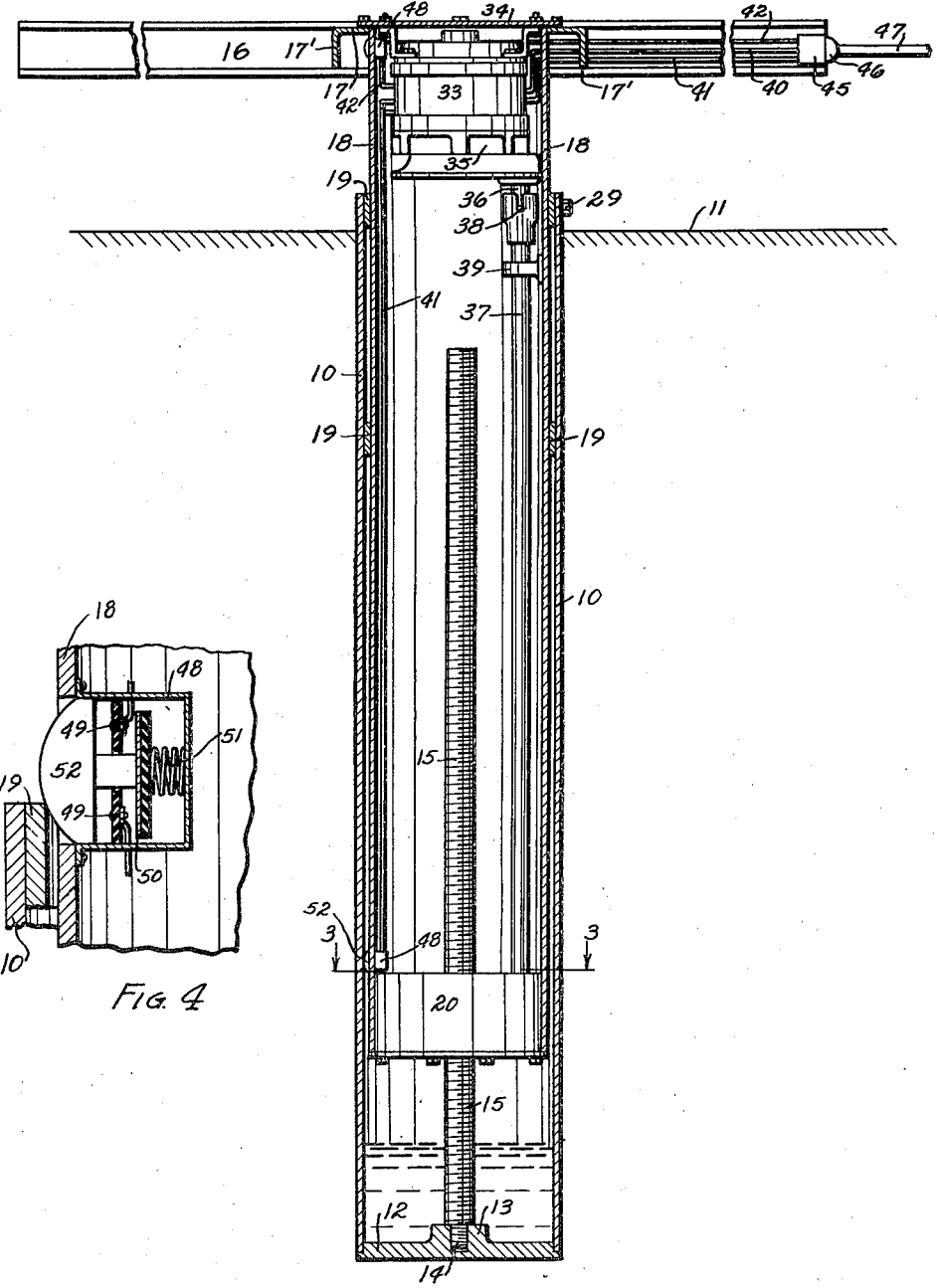
Figure 2:
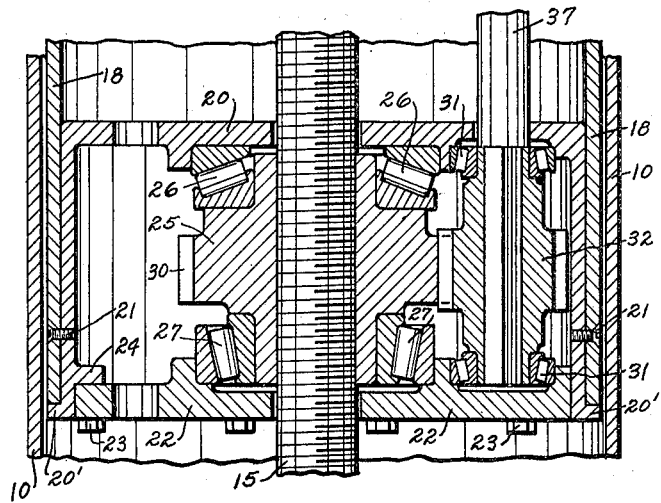
Figure 5:
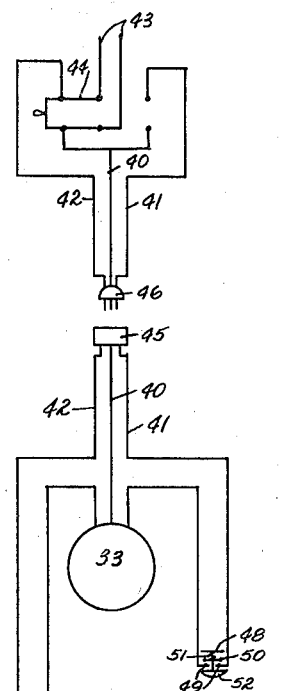
Figure 3:
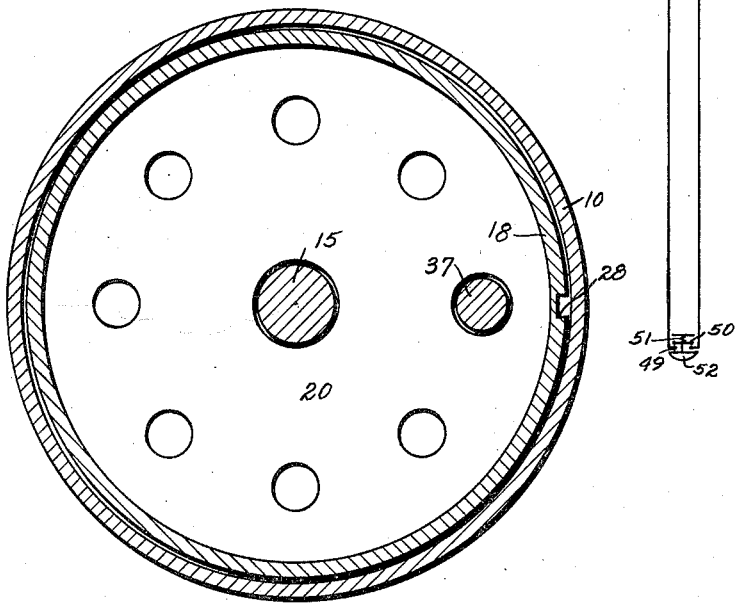

Figure 1 is a vertical section taken axially through a practical installation of a preferred embodiment of my invention, certain portions being broken away to conserve space. Figure 2 is a fragmentary, detail section, on an enlarged scale, through a power transmission unit assembly employed in the invention. Figure 3 is a plan view of the showing of Figure 2, taken on the indicated line 3—3 of Figure 1. Figure 4 is a fragmentary, detail section, on an enlarged scale, of switch means associated with the device to automatically limit its operative range of travel. Figure 5 is a conventionalized diagram of the electrical wiring, connections, and facilities employed in the operative control of the apparatus.

In the construction of the improvement as shown, the numeral 10 designates a suitable hollow cylinder or tubular casing adapted to be sunk into the ground and fixed therein with its axis vertical and its upper end extending a few inches above the ground line, indicated at 11. Both ends of the cylinder 10 are straight and open, the cylinder being of uniform bore throughout its length, and the lower end of the cylinder 10 telescopes over and fits closely against the shouldered periphery of a circular plate 12 and is suitably fixed, as by means of welding, or the like, to said plate 12 in a manner to prevent separation therebetween. The plate 12 is preferably provided with a central boss 13 wherein is formed a central, axial, internally-threaded bore or recess adapted to receive and threadedly engage the threaded terminal stud 14 of an elongated screw 15 which is thus fixed and positioned in vertical, upstanding relation axially within the cylinder 10, it being preferable that the threads of the screw 15 and stud 14 be oppositely directed or pitched. The cylinder 10, with the plate 11 and screw 15 associated therewith as above described, is sunk into the ground to a depth such that only a few inches of its upper open end project above the ground line, and is firmly anchored and secured in such position in any suitable or desired manner adequate to immobilize the unit and hold it against rotation, axial displacement or tilting under the loads to be carried thereby.

The platform of the improved lift may be of any desired construction suitable to the specific purpose for which the lift is to be employed, and may satisfactorily take the form of a pair of identical metal beams or rails 16, of suitable length, spaced apart in parallel relation on opposite sides of the cylinder 10 and rigidly interconnected at their midportion by means of a flat plate 17 bridging therebetween and fixedly secured at its margins to said rails, the margins of said plate transverse to the rails 16 preferably being formed with down-turned webs 17' to complete a box adapted to telescope over and cover the open upper end of the cylinder 10. A plunger sleeve 18, in the form of a straight, hollow, open-ended cylinder, is provided in a size which will telescope freely within the cylinder 10, and the upper end of the sleeve 18 is suitably and rigidly secured, as by means of welding or the like, to the under surface of the plate 17 so that the assembly of rails 16 and plate 17 is supported by and mounted for travel with the sleeve 18. To minimize frictional effect, and to guide and position the sleeve 18 during its travel within and axially of the cylinder 10, suitable bearing rings 19 are fitted in spaced relation within the upper portion of the cylinder 10 and held, as by means of a tightly pressed fit, or otherwise against displacement relative to said cylinder, it being desirable that one of the rings 19 be disposed closely adjacent the upper end of the cylinder 10 while the other of said rings is spaced downwardly within said cylinder such a distance as may be necessary for proper functioning of the device. The sleeve 18 has a length slightly less than that of the cylinder 10 and hence extends to a point closely adjacent the plate 12 when said sleeve is at the lower limit of its telescoping relation with said cylinder, and the lower open end of the sleeve 18 telescopes closely over the outer cylindrical wall of a transmission housing 20 and abuts against an outwardly-directed, annular flange 20' formed as a terminal member on the open lower end of the housing 20, suitable means, such as a set screw 21, engaging through the sleeve 18 and wall of the housing 20 to hold the latter against rotation relative to the former. The housing 20 is preferably formed as an inverted, cup-shaped unit of metal by moulding or casting, and is provided with a removable, disc-like closure plate 22 arranged to fit within its open lower end and be therein secured by means of bolts or studs 23 engaging through margins of said plate and with lugs 24 projecting inwardly from the housing wall. The housing 20 and plate 22 cooperate to form a chamber removably carried within the lower end of the sleeve 18, the upper and lower walls of said chamber being centrally apertured to permit free passage of the screw 15 axially therethrough. An elongated, threaded nut 25 is rotatably housed within the chamber in threaded engagement with the screw 15, so that rotation of said nut is productive of axial travel thereof along said screw, and suitable upper and lower anti-friction bearing assemblies 26 and 27, respectively, are disposed in operative relation between adjacent portions of the nut 25 and chamber walls to guide and position the nut 25 in its travel along the screw 15 and to transmit linear travel of the nut 25 along said screw for corresponding and consequent linear travel of the chamber and sleeve 18 associated therewith, such linear travel of the sleeve being productive of altitudinal variation of the platform rails 16 and load carried thereby. To prevent rotation of the sleeve 18 within and relative to the cylinder 10 during rotation of the nut 25, a longitudinal groove or spline-way 28 is formed exteriorly of the sleeve 18 in position to receive and engage about the inner end of a threaded stud 29 adjustably mounted in threaded engagement through the upper end of the cylinder 10.

The portion of the nut 25 between the bearings 26 and 27 is radially enlarged and formed with gear teeth 30 circumferentially of its outer margin, said teeth preferably lying in planes parallel with the axis of the screw 15. Rotatably carried in suitable bearings 31 within the chamber formed between housing 20 and plate 22, a pinion 32 is disposed in meshing relation with the teeth 30 of the nut 25, so that rotation of said pinion acts to rotate said nut at relatively reduced speed.

Housed within the upper end of the sleeve 18, an electric motor 33 is removably secured to and in depending relation with a plate 34 which overlies, covers, and is removably secured to margins of an opening through the central portion of the plate 17, said motor thus being mounted for convenient removal and replacement relative to the assembly. The motor 33 is provided with a gear reduction box 35 from which a slow-speed power take-off shaft 36 depends in parallel relation with the sleeve axis and in alignment with the axis of the pinion 32, and a drive shaft 37 operatively interconnects said power take-off 36 with said pinion 32. For convenience of assembly and disassembly the lower end of the shaft 37 may be splined or angular in section to engage within a corresponding bore of the pinion 32, while the upper end of said shaft is formed to telescopically receive a transverse pin 38, or equivalent element, carried by the shaft 36, a suitable bearing 39 being fixed to the inner wall of the sleeve 18 in position to support and guide the upper portion of the shaft 37 while the lower portion of said shaft passes freely through a hole in the housing 20 and is guided and positioned by the bearings 31 which support the pinion 32.

With the arrangement shown, it should be obvious that actuation of the motor 33 in one direction will serve to rotate the shafts 36 and 37 for corresponding rotation of the pinion 32 and consequent rotation of the nut 25 on the screw 15, which rotation of the nut will result in linear travel of said nut, transmission chamber, sleeve 18, and platform members 16 in one direction, while actuation of the motor 33 in the opposite direction will be productive, through the same agencies, of linear travel of the sleeve 18 and platform members 16 in an opposite direction. The motor 33 is, of course, of reversible type.

Any suitable arrangement and system of wiring may be employed to operatively connect the motor 33 through suitable control means and with a source of electric current, for actuation of said motor in the manner above described, but it is desirable that the wiring and control means be so arranged as to automatically interrupt the operative circuit to the motor at each limit of the range of actuation of the sleeve 18, and an arrangement effective for such purpose is illustrated and hereinafter described. The motor 33 being of reversible type, a minimum of three conductors or leads is required to effect selective actuation of the motor in both directions, and such leads are indicated in the drawings as conductors 40, 41, and 42. The two conductors representing a power line leading from a source of electrical energy are designated by the numeral 43 and are shown as operatively connected with the throws of a two-pole, double-throw switch 44, which switch has its corresponding poles on one side of the circuit connected with the conductor 40 which thus becomes common to both circuits leading to the motor 33. Completing the circuit through the switch 44, the conductor 42 connects with the pole available on one side of the switch and the conductor 41 connects with the corresponding pole on the other side of the switch, so that closing of the switch in one direction completes a circuit to the motor 33 through the conductors 40 and 42, while closing of the switch in the opposite direction completes a circuit to the said motor through the leads 40 and 41, thereby providing means for selectively actuating said motor in opposite directions. As a matter of convenience, and to facilitate installation and operative connection of the apparatus, the conductors 40, 41, and 42 are led from the motor 33 outwardly through the upper end of the sleeve 18 and along the inner face of one of the platform members 16 to connection with a junction box 45 fixed to the end of said platform member for cooperation with a plug 46 from which said conductors are continued in the form of a flexible cable 47 which connects with the switch 44 conveniently located at a point remote from the lift assembly.

To provide means for automatically interrupting current flow to the motor 33 at each limit of the range of travel of the sleeve 18, the leads 41 and 42 are led through normally-closed, spring switch units properly positioned on and carried by said sleeve before connection of said leads with said motor, one of said spring switch units being disposed adjacent the upper end of the sleeve 18 for circuit-breaking engagement with the upper ring 19 as the sleeve 18 approaches the lower limit of its range of travel, said switch unit being included in the circuit which actuates the motor for descending travel of the platform, and the other switch unit is located adjacent the lower end of the sleeve 18 for circuit-breaking engagement with the lower of the rings 19 when the sleeve 18 approaches the upper limit of its range of travel, said latter switch unit being included in the circuit which actuates the motor 33 for upward travel of the platform. The spring switch units may be of any suitable or desired construction, and an arrangement which will function satisfactorily for the purpose set forth is illustrated in Figure 4 as comprising a housing 48 adapted to be secured within and to the inner wall of the sleeve 18, a pair of electrically isolated contact points 49 supported within said housing for connection with separated portions of either lead 41 or 42 and disposed for circuit-completing contact at times with a contact plate 50 normally urged by a spring 51 into bridging engagement between said contacts 49, said plate 50 being fixedly associated with an arcuate actuating head 52 disposed with its curved margin in projecting relation through and beyond a slot in the sleeve 18 for contacting engagement with the edge of one of the rings 19, such engagement between the head 52 and a ring 19 operating to move said head inwardly within the housing 48 and separate the contact bar 50 from its circuit-completing engagement with the contacts 49.

To insure proper lubrication of the working elements of the apparatus, the lower portion of the cylinder 10 may be supplied with a quantity of suitable oil to a depth sufficient to substantially immerse the transmission assembly carried by the lower end of the sleeve 18 therein when said sleeve is at the lower limit of its range of travel, suitable apertures being formed in the top plate of the housing 20 and in the closure plate 22 to permit free flow of the lubricant within the transmission chamber and about the movable elements therein.

In the operation of the improvement as shown and described, insertion of the plug 46 in the outlet box 45 serves to supply power to the motor 33 when the switch 44 is closed, one circuit controlled by said switch and serving said motor operating to actuate the motor in a direction such as will elevate the platform while the other circuit, when completed by the switch 44, actuates the motor for lowering of the platform, it being obvious that opening of switch 44 or disconnection of the plug 46 from the box 45 and consequent stopping of the motor will serve to arrest travel of the platform at any desired point in its travel. With the spring switch units properly positioned on the sleeve 18, either circuit serving the motor will be broken when the platform reaches that limit of its range of travel which will bring the corresponding switch into engagement with one of the rings 19, thus insuring against over travel of the elevator unit and consequent damage to operating mechanism even though opening of the switch 44 be entirely neglected. Since the circuits through the spring switch units are complete except when the elevator assembly is at one or the other limit of its range of travel, the elevator assembly can be caused to travel in whatever direction and to whatever extent may be desired through manipulation of the switch 44. When desired, the threaded stud 29 may be unscrewed from its engagement with the groove or spline 28 to permit rotation of the sleeve 18 within the cylinder 10 and consequent rotation of the platform 16.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A vehicle lift comprising a hollow casing vertically disposed and open at its upper end, a threaded stem fixed at its lower end relative to and upstanding centrally within said casing, a second hollow casing telescoped within and for reciprocation axially of said first casing, a skeleton platform carried by the upper end of said second casing, a nut threadedly engaging said stem in axially-fixed relation with said second casing, an electric motor fixed within the upper end of said second casing, and means and connections between said motor and nut whereby actuation of the former is transmitted to effect rotation of the latter.

2. A vehicle lift comprising a hollow casing fixed with its axis vertical and open at its upper end, a threaded stem fixed at its lower end relative to and upstanding centrally within said casing, a hollow plunger telescoped within and for axial reciprocation relative to said casing, guide and sealing means fixed within the upper portion of said casing for sliding engagement against the exterior wall of said plunger, a skeleton frame carried by the upper end of said plunger, a housing carried by the lower end of said plunger and freely slidable relative to said stem, a nut rotatably disposed within said housing in threaded engagement with said stem and held therein against axial displacement relative to said plunger, an electric motor fixed in the upper portion of said plunger, and means and connections between said motor and nut operable to transmit power from said motor to effect rotation of said nut.

3. A vehicle lift comprising a hollow, open-ended casing fixed in axially-vertical position, a closure plate fixed to and traversing the lower end of said casing, a threaded stem fixed at its lower end centrally of said plate and upstanding axially within said casing, a hollow plunger telescoped within and for axial reciprocation relative to said casing, a rectangular plate fixed to and transversely of the upper end of said plunger, beams secured to opposite margins of said plate in spaced, parallel relation to form a skeleton platform, an electric motor carried by said rectangular plate in depending relation within the upper portion of said plunger, a nut fixed axially of and rotatable within the lower portion of said plunger in threaded engagement with said stem, and means and connections between said motor and nut whereby actuation of the former is transmitted to effect rotation of the latter.

4. A vehicle lift comprising a hollow, elongated, open-ended cylinder fixedly disposed with its axis vertical and its upper end projecting above a ground line, a closure plate fixed to and traversing the lower end of said cylinder, a threaded stem removably fixed centrally of said plate and upstanding axially within said cylinder, a hollow, cylindrical plunger telescoped within and for reciprocation axially of said cylinder, a skeleton platform carried by the upper end of said plunger, an electric motor removably carried by said platform in depending relation within the upper portion of said plunger, a cylindrical housing telescoped within and removably secured to the lower portion of said plunger, a nut rotatable within said housing in threaded engagement with said stem, anti-friction bearings engaging between end portions of said nut and adjacent housing walls to limit axial displacement of said nut relative to said housing, gear teeth circumferentially of said nut, a pinion rotatably mounted in said housing in meshing relation with the gear teeth of said nut, and means interconnecting said pinion and the power shaft of said motor whereby actuation of the latter is transmitted to effect rotation of the former.

CHARLES BOSICK.